(12) United States Patent
Gradu

(10) Patent No.: US 6,293,704 B1
(45) Date of Patent: Sep. 25, 2001

(54) SHAFT MOUNTING WITH ENHANCED STABILITY

(75) Inventor: Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/528,948

(22) Filed: Mar. 21, 2000

(51) Int. Cl.$^7$ .............................. F16C 19/52; F16C 35/00
(52) U.S. Cl. ...................... 384/557; 384/564; 384/585; 384/905
(58) Field of Search .................................. 384/557, 905, 384/559, 564, 569, 571, 585, 493

(56) References Cited

U.S. PATENT DOCUMENTS

| | | |
|---|---|---|
| 1,904,395 | 4/1933 | Whitehead . |
| 2,019,464 * | 10/1935 | Riblet ................................ 384/571 X |
| 3,311,431 * | 3/1967 | Hilliard ............................. 384/557 X |
| 3,561,829 * | 2/1971 | Heldt .................................... 384/557 |
| 4,990,000 * | 2/1991 | Harsdorff ......................... 384/585 X |
| 5,114,248 * | 5/1992 | Harsdorff .......................... 384/571 X |

FOREIGN PATENT DOCUMENTS

2027135 A * 2/1980 (GB) ..................................... 384/585

* cited by examiner

*Primary Examiner*—Thomas R. Hannon
(74) *Attorney, Agent, or Firm*—Polster, Lieder, Woodruff & Lucchesi, L.C.

(57) ABSTRACT

A shaft rotates within a housing on a double row tapered roller bearing and remains extremely stable at all temperatures, even though the housing is formed from a light weight metal having a significantly greater coefficient of thermal expansion than the metal of the bearing. To this end, the housing contains a bore defined by a cylindrical surface and a conical surface which flares away from the cylindrical surface and opens out of one face of the housing. The bearing has two cones which surround the shaft, a unitary or double cup which fits into the bore of the housing, and tapered rollers arranged in two rows between the cones and cup. The double cup on its exterior has a cylindrical surface which fits into the cylindrical surface of the housing bore and a flange provided with a beveled face which is against the conical surface of the housing bore. In addition, the cup has a threaded end which projects axially beyond the cylindrical surface of the cup engages a nut that is on the housing at the end of the cylindrical surface of the bore. The nut draws the beveled surface of the cup flange tightly against the conical surface of the housing bore. With an elevation in temperature, the housing expands axially and causes the flange to seat even more tightly against the conical surface of the housing, so that the cup remains firmly positioned, both radially and axially, in the housing, even though the cylindrical surface of the housing bore enlarges with respect to the cylindrical surface on the housing.

15 Claims, 2 Drawing Sheets

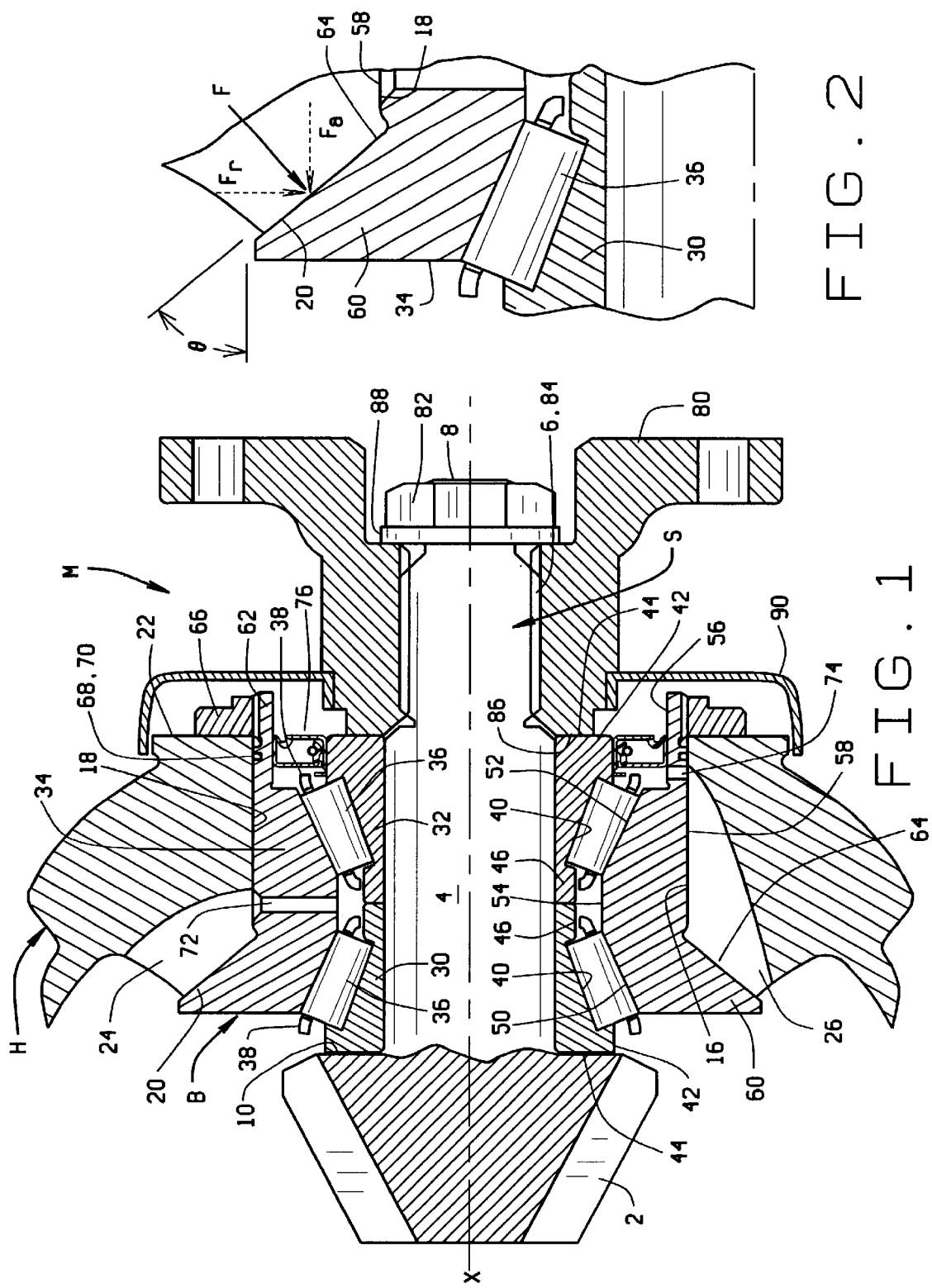

SHAFT MOUNTING WITH ENHANCED STABILITY

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates in general to a mounting for a rotating shaft and, more particularly to a mounting that retains stiffness through temperature variations.

A rotating shaft requires support of one type or another, and typically that support derives from a housing in which the shaft or at least a portion of it rotates, usually on some type of antifriction bearing. This type of bearing has an inner race around the shaft, an outer race in the housing and rolling elements between the two races to enable the inner race to rotate with minimal friction within the outer race and, of course, the shaft within the housing. The shaft normally transfers torque, and steel is best suited for this purpose. The components of the bearing must resist cyclic loads of substantial magnitude, and again, steel is the most practical material, particularly steel which has been case hardened or through hardened. But, being around the bearing and shaft, the housing has a larger cross-section to transfer loads. To reduce weight, the housing is often formed of a light weight metal, aluminum being typical. The coefficients of thermal expansion for light weight metals, such as aluminum, exceed the coefficients for various steels, and this produces differential thermal expansion which detracts from the stability of the shaft.

For example, the typical drive axle for a rear wheel drive vehicle has a housing containing a ring gear and a pinion gear which meshes with the ring gear. The pinion gear should rotate with stability to assure minimal fatigue and wear. To this end, the shaft on which it is mounted may be confined by a double row tapered roller bearing set to a condition of slight preload, thus eliminating radial and axial play within the bearing. A slight interference fit between the inner race or cones of the bearing and the shaft eliminates radial motion between the shaft and inner race. The outer race usually fits into the housing with a tight fit and typically takes the form of a double cup having a flange at one end. The flange fits against the exterior face of the housing to which it is secured with machine screws that thread into the housing. Even though a tight fit may exist between the double cup and the housing at assembly, that fit may disappear during operation owing to differential thermal expansion. When that occurs, only the flange supports the bearing in the housing, and the screws which secure it often do not prevent the bearing and the shaft from displacing radially in the housing.

SUMMARY OF THE INVENTION

The present invention resides in a mounting for a rotary shaft, and that mounting includes a housing having a bore, and an antifriction bearing in the bore, but the housing is formed from a metal having a higher coefficient of thermal expansion than the metal of the bearing. The bore in the housing is defined, at least in part, by one surface against which a surface on the outer race of the bearing bears, and at least one of those surfaces is oblique to to the axis of the bearing and is otherwise oriented such that a force which urges the two surfaces together tends to hold the outer race in a fixed position on the housing.

DESCRIPTION OF THE DRAWINGS

FIG. 1 is a longitudinal sectional view of a shaft mounting constructed in accordance with and embodying the present invention;

FIG. 2 is an enlarged fragmentary view of the mounting showing schematically the forces acting at the interface between the cup flange and the conical surface of the housing bore.

DETAILED DESCRIPTION

Figure 3:
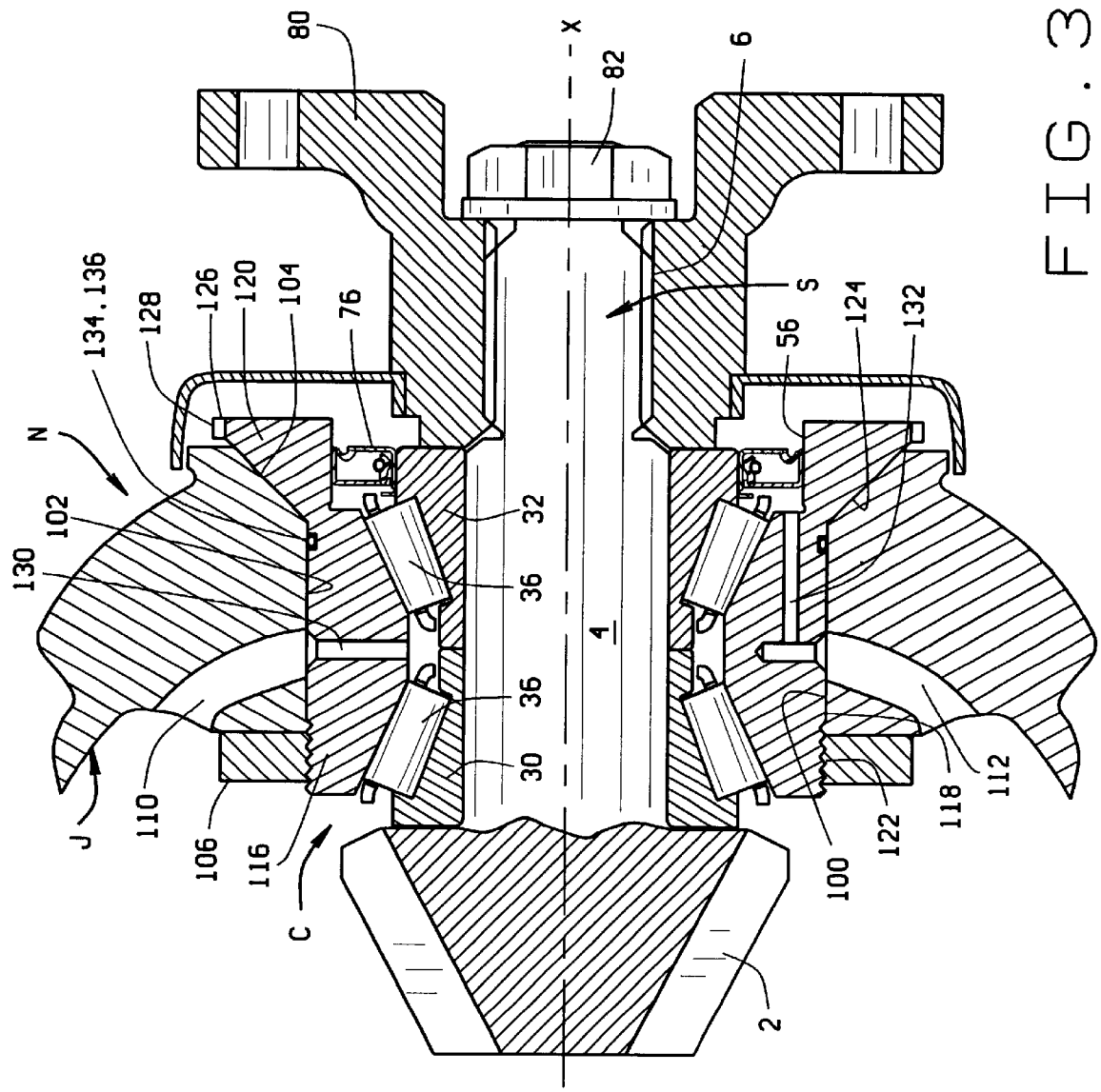
FIG. 3 is a longitudinal sectional view of a modified shaft mounting.

Referring now to the drawings (FIG. 1) a shaft S rotates in a housing H about an axis X on a double row tapered roller bearing B, and provides an extremely stable mounting M for a pinion 2 in this instance, although it may serve to support some other type of gear or some other device such as a cam, a roller, a cutting tool or a work piece. In any event, the shaft S and the pinion 2 on it are formed from steel, as is the bearing B. The housing H, on the other hand, is formed from a lighter weight nonferrous metal, typically aluminum. The nonferrous metal of the housing H has a greater coefficient of thermal expansion than the steel of the bearing B. Thus, with changes in temperature, the housing H undergoes greater expansions and contractions than the bearing B. Even so, the stability remains.

Considering the shaft S first, the pinion 2 forms an integral part of it. Indeed, the pinion 2 is located at one end of a cylindrical bearing seat 4 around which the tapered roller bearing B fits. The bearing seat 4 at its other end extends out to a spline 6 of reduced diameter, which in turn extends out to a threaded end 8 of still lesser diameter. The pinion 2 forms a shoulder 10 at the end of the cylindrical bearing seat 4.

The housing H encloses the region in which the pinion 2 rotates, and it supports the bearing B which in turn supports the shaft S. To this end, the housing H contains a bore 16 formed by a cylindrical surface 18 and a conical surface 20. The cylindrical surface 18 at one end opens out of the housing H at an end surface 22 that is on the exterior of the housing H and is squared off with respect to the axis X. At its other end the cylindrical surface 18 opens into the conical surface 20 which flares outwardly and opens into the interior of the housing H. Above the bore 16 the housing H has a supply channel 24 which extends from the bore 16 to the interior of the housing H. Below the bore 16 the housing H has a drain channel 26 which extends from the far end of the bore 16 to the interior of the housing H.

The bearing B includes (FIG. 1) an inner race in the form of two cones 30 and 32, an outer race in the form of a double cup 34 located around the cones 30 and 32, and rolling elements in the form of tapered rollers 36 located between the cones 30 and 32 and the cup 34, there being one row around the cone 30 and the other row around the cone 32. In addition, the bearing B has a cage 38 for each row of tapered rollers 36. The cages 38 fit over the rollers 36 to keep the proper spacing between the rollers 36 and to retain the rollers 36 on their respective cones 30 and 32 when the cones 30 and 32 are withdrawn from the cup 34.

Each cone 30 and 32 includes a tapered raceway 40 which us presented outwardly away from the axis X and toward the surrounding cup 34. At the large end of its raceway 40, each cone 30 and 32 has a thrust rib 42 which extends out to a back face 44 that is squared off with respect to the axis X. The small end of the raceway 40 lies along a retaining rib 46. The two cones 30 and 32 fit over the cylindrical bearing seat 4 of the shaft S with a slight interference fit—and with the back face 44 of the cone 30 abutting the shoulder 10 on the pinion 2 and the back face 44 of the cone 32 located at the other end of the bearing seat 4. The two cones 30 and 32 abut along the ends of their retaining ribs 46, thus establishing a prescribed distance between the two raceways 40.

The double cup 34 fits into the bore 16 of the housing H and has tapered raceways 50 and 52 which taper downwardly to an intervening surface 54. The raceway 50 surrounds the raceway 40 on the cone 30 and at its large end opens into the interior of the housing H. The raceway 52 surrounds the raceway 40 on the cone 32 and at its large end opens into a cylindrical end bore 56 in which the thrust rib 42 of the cone 32 is located. The end bore 56 opens out of the bearing B beyond the end surface 22 of the housing H.

On its exterior, the cup 34 has a cylindrical surface 58 which lies between a beveled flange 60 and a threaded end 62. The cylindrical surface 58 fits into the cylindrical surface 18 of the bore 16, there being a loose fit between the two cylindrical surfaces 18 and 58, so that the cup 34 may be inserted into and removed from the bore 16 by hand, although an interference fit will suffice as well. The flange 60 has a beveled face 64, the inclination of which matches that of the conical surface 20 of the bore 16. When the cup 34 is fully inserted into the bore 16, the beveled face 64 of the flange 60 for the cup 34 seats against the conical surface 20 of the bore 16, and the threaded end 62 projects beyond the end surface 22 of the housing H. The threads on the threaded end 62 are engaged by a nut 66 which is turned down against the end surface 22 of the housing H. Thus, the flange 60 and the nut 66 clamp down on the housing H and firmly secure the cup 34 in the housing H.

Where the cylindrical surface 58 of the cup 34 merges into the beveled surface 64 of the flange 60, the cup 34 has a slight undercut. Also, near the threaded end 62 the cup 34 has a groove 68 which opens out of the cylindrical surface 58. The groove 68 contains an O-ring 70 which is compressed against the cylindrical surface 18 of the bore 16 in the housing H, and thus establishes a fluid barrier between the two cylindrical surfaces 18 and 58. Finally, the cup 34 contains an oil supply port 72 and a drain port 74. The supply port 72 extends between the cylindrical surface 58 and the intervening surface 54. It lies at the top of the cup 34 where it aligns with the supply channel 24 in the housing H. The drain port 74 lies at the bottom of the cup 34 where it extends between the end bore 56 and the cylindrical surface 58. It opens into the drain channel 26.

The tapered rollers 36 are organized in two rows—one between the raceway 40 of the cone 30 and the surrounding raceway 50 of the cup 34 and the other between the raceway 40 of the cone 32 and the raceway 52 of the cup 34. The tapered side faces of the rollers 36 bear against the raceways 40 on the cones 30 and 32 and the raceways 50 and 52 on the cup 34, there being essentially line contact. The large end faces of the rollers 36 bear against the thrust ribs 42 which prevent the rollers 36 from migrating up the raceways 40 and the raceways 50 and 52 and out the bearing B. The rollers 36 are on apex, meaning that the conical envelopes for the rollers 36 around the cone 30 have their apices at a common point along the axis X and the conical envelopes for the rollers 36 around the cone 32 have their apices at another common point along the axis X. This produces pure rolling contact between the side faces of the rollers 36 and the raceways 40, 50 and 52. Moreover, the axial spacing between the raceways 40 on the two cones 30 and 32 and the axial spacing between the raceways 50 and 52 of the cup 34 are such that the bearing B operates with a slight preload. As such no free motion exists in any of the rollers 36 of the two rows.

The end bore 56 of the cup 34 contains a seal 76 which fits around the thrust rib 42 on the cone 32 to establish a live fluid barrier at that end of the bearing B, which is the end exposed at the exterior of the housing H. The seal 76 prevents lubricant from escaping through the annular space between the cup 34 and cone 32 and further prevents contaminants from entering that space. U.S. Pat. No. 5,458, 420 discloses seals suitable for use as the seal 76.

The shaft S, with its pinion 2, is retained in the cones 30 and 32 of the bearing B by a drive flange 80 which fits over the spline 6 and a nut 82 which threads over the threaded end 8. The drive flange 80 contains a spline 84 which engages the spline 6 of the shaft S and has end faces 86 and 88 which are squared off with respect to the axis X. The end face 86 bears against the back face of the cone 32, whereas the end face 88 is located at the threaded end 8 on the shaft S. The nut 82 is turned down against the end face 88, clamping the two cones 30 and 32 between shoulder 10 on the pinion 2 and the end face 86 on the drive flange 80. The force holds the two cones 30 and 32 together with the end or front faces on the retaining ribs 46 abutting. Finally, the drive flange 80 carries a slinger 90 which rotates with the drive flange 80 and extends over a generally axially directed surface located on the housing H outwardly from the end surface 22. The slinger 90 deflects contaminants away from the seal 76 and the end of the bearing B which it closes.

In operation, the shaft S rotates in the housing H on the bearing B. Being an integral part of the shaft S, the pinion 2 revolves with the shaft S, although within the interior of the housing H, while the drive flange 80, which is secured to the shaft S, revolves at the exterior of the housing H. Upon assembly and before the shaft S is put in operation, the shaft S possesses a good measure of rigidity. This means that it is free to rotate about the axis X with minimal friction, but has no axial or radial play with respect to the housing H. The same of course holds true with respect to the pinion 2, since it is an integral part of the shaft S. When the shaft S is set into operation, the temperature of the shaft 2, the housing H, and the bearing B will rise, owing to friction in the bearing B and pinion 2 or perhaps the temperature will rise for some other reason. All will expand, but the housing H being formed from aluminum, will expand more than the bearing B and the shaft S, which are both formed from steel. After all, the coefficient of thermal expansion for aluminum is about twice the coefficient of expansion for low and high carbon steel.

When the housing H expands, the cylindrical surface 18 and conical surface 20 of the bore 16 enlarge radially, and this might loosen the fit between the cylindrical surface 58 of the cup 34 and the cylindrical surface 18 of the housing bore 16. But the housing H also expands axially. The axial expansion of the housing H causes the housing H to lodge more tightly between the beveled flange 60 and the nut 66 on the cup 34. At the interface, where the conical surface 18 of the housing and the beveled face 64 of the flange 60 are in face-to-face contact, the axial force $F_a$ (FIG. 2) translates into a larger contact force F which operates perpendicular to the interface. That contact force F is uniform along the beveled face 64 of the flange 60—for the full circumference of the flange 60. The magnified contact force F has a radial component $F_r$ which is likewise uniform around the flange 60, and that radial component $F_r$ serves to maintain the cup 34 centered in the bore 16, even when the cylindrical exterior surface 58 of the cup 34 separates from the surrounding cylindrical surface 18 of the housing bore 16.

For optimum results, the included angle θ between the interface and the axis X, that is to say the angle at which the conical surface 18 and the beveled surface 64 are disposed with respect to the axis X, should be between 20° and 70°, and preferably should be about 45°.

A modified mounting N (FIG. 3) is similar to the mounting M and requires no alternation to the shaft S and its pinion 2 or to the drive flange 80. The mounting N does have a slightly altered housing J and a slightly altered bearing C.

Insofar as the modified housing J is concerned, it contains a bore 100 that includes a cylindrical surface 102 and a conical surface 104. The cylindrical surface 102 opens into the interior of the housing J through a nut 106 which is secured firmly to the housing J so that it cannot rotate on the housing J. The conical surface 104 opens out of the exterior surface of the housing H and is somewhat shorter than the cylindrical surface 102. The housing J also includes a supply channel 110 which extends from the interior of the housing J to the upper region of the cylindrical surface 102 where it opens into the bore 100 and a drain channel 112 which leads from the bore 100, again at its cylindrical surface 102, to the interior of the housing J.

With regard to the modified bearing C, it has the same cones 30 and 32 and tapered rollers 36 around those cones. It also has a double cup 116 which is configured to conform to the bore 100. To be sure, the cup 116 has raceways 50 and 52 against which the rollers 36 bear and also an intervening surface 54 between the raceways 50 and 54. The raceway 52 opens into an end bore 56 which contains a seal 76, the same as the cup 34 for the bearing B. However, on its exterior the cup 116 has a cylindrical surface 118 which lies between a beveled flange 120 and a threaded end 122. The flange 120 has a beveled face 124, the inclination of which matches that of the conical surface 104 in the bore 100.

Indeed, the double cup 116 fits into the bore 100 of the housing J with the beveled face 124 of its flange 120 against the conical surface 104 of the bore 100 and its cylindrical surface 118 extended through the cylindrical surface 102 of the bore 100 with a loose fit. The threaded end of the double cup 116 extends into and engages the threads of the nut 106 that is on the interior face of the housing J. The beveled flange 120 of the double cup 116 at its end has an outwardly directed lip 126 that is provided with slots 128. Here the cup 116 may be engaged by a spanner-type tool to turn it and thus draw the threaded end 122 tightly into the nut 106 on the housing J. This, of course, brings the beveled face 124 of the flange 120 snugly against the conical surface 104 of the housing bore 100.

The double cup 116 contains a supply port 130 which leads from the supply channel 110 in the housing J to the interior of the bearing C, opening into that interior through the intervening surface 54. It also has a drain port 132 which leads from the end bore 56 to the drain channel 112 of the housing J. Finally, the double cup 116 has a groove 134 which opens out of its cylindrical surface 118 near the beveled flange 124. The groove 134 contains an O-ring 136.

The modified bearing C is installed on cylindrical bearing seat 4 of the shaft S and thereafter the drive flange 80 is installed over the spline 6 and secured to the shaft S with the nut 82, all remote from the housing J. The shaft S, bearing C, and drive flange 80 are then inserted as a unit into the housing bore 100 of the J from the exterior of the housing J. To this end, the double cup 116 of the bearing C, with the shaft S extended through it, is inserted into the bore 100 of the housing J with the threaded end 122 leading. The threaded end 122 of the cup 116 advances through the conical surface 104 and then the cylindrical surface 102 of the bore 100, and ultimately encounters the nut 106 at the end of the bore 100, whereupon the cup 116 is rotated. The threads of its threaded end 122 engage the threads of the nut 106 and as the double cup 116 rotates it advances still farther into the bore 100. In time, the beveled face 124 on the flange 120 of the cup 116 bears against the conical surface 104 in the bore 100 of the housing J. Using a spanner-type tool which engages the lip 126 of the flange 120 at the slots 128, the double cup 116 is turned still farther until the beveled face 124 on its flange 120 bears snugly against the conical surface 108 of the bore 100, while ensuring that the supply and drain ports 130 and 132 of the double cup 116 align with the supply and drain channels 24 and 26, respectively, of the housing J.

The modified mounting N likewise keeps the axis X of the shaft S rigid even though the aluminum housing J and the shaft S experience different variations in temperature and undergo different rates of thermal expansion and contraction.

While the bearings B and C are double row tapered roller bearings, other bearings capable of being set in a condition of preload may be used as well. Among such bearings are angular contact ball bearings and spherical roller bearings.

What is claimed is:

1. A mounting for a shaft that rotates about an axis, said mounting comprising: a housing having a bore, the center of which lies along the axis, the bore being defined at least in part by a first surface that is inclined with respect to the axis; and an antifriction bearing for supporting the shaft in the housing, the bearing including an outer race that is located in bore and is formed from a material having a lower coefficient of thermal expansion than the material from which the housing is formed, the outer race having a second surface which is also inclined with respect to the axis and bears against the first surface on the housing, the outer race being secured in the bore such that when the housing expands axially more than the outer race, the first surface bears snugly against the second surface, the outer race also having a raceway that is presented inwardly toward the axis, the bearing also including a inner race that is located within the outer race and has a raceway presented outwardly away from the axis and toward the raceway of the outer race, the bearing further including rolling elements which are arranged in a row between the raceways of the outer and inner races; at least one of the first and second surfaces being oblique to the axis and oriented such that the force exerted on the second surface by the first surface tends to hold the outer race in a fixed position radially with respect to the axis.

2. A mounting according to claim 1 wherein the first surface is substantially conical.

3. A mounting according to claim 1 wherein the second surface is substantially conical.

4. A mounting according to claim 1 wherein the first and second surfaces are substantially conical and are in face-to-face contact.

5. A mounting according to claim 4 wherein the bore includes a cylindrical surface which lies between the end surface and the first surface; and wherein the outer race has a flange on which the second surface is located and a cylindrical surface which lies within the cylindrical surface of the bore and extends between the flange and the threaded end.

6. A mounting according to claim 5 and further comprising a shaft extended through and supported on the inner race of the bearing.

7. A mounting according to claim 4 wherein the housing has an end surface which is located at an angle with respect to the axis and is presented away from the first surface, and the outer race has a threaded end which projects beyond the end surface on the housing; and wherein a nut threads over the threaded end of the outer race and bears against the end surface of the housing and, when tightened, urges the second surface of the outer race against the first surface of the housing.

8. A mounting according to claim 4 wherein the housing encloses an interior space and has an interior surface presented toward that space and an exterior surface presented away from the space, wherein the first surface of bore opens out of the exterior surface of the housing, wherein a nut is attached to the housing at its interior surface; and wherein the outer race has a threaded end which is located remote from its second surface and engages the nut on the housing to draw the second surface against the first surface.

9. The combination comprising: a housing having a bore; a shaft extended through the bore for rotation about an axis; and an antifriction bearing located in the bore of the housing and supporting the shaft in the housing, the bearing including an outer race that is secured to the housing and has an raceway presented inwardly toward the axis, an inner race that is secured to the shaft and has a raceway presented outwardly away from the axis and toward the raceway of the outer race, and rolling elements arranged in a row between and contacting the raceways of the inner and outer races; wherein the bore is defined by a cylindrical surface and an inclined surface that flares away from one end of the cylindrical surface; wherein a nut is against the housing at the other end of the cylindrical surface, with the end surface being at an angle to the axis; wherein the outer race on its exterior has a cylindrical surface, a flange beyond one end of the cylindrical surface, and a threaded end beyond the other end of the cylindrical surface, the cylindrical surface of the outer race lying within and close to the cylindrical surface of the housing bore, the flange of the outer race projecting beyond the cylindrical surface of the outer race and having a beveled surface which bears against the inclined surface of the housing bore, the threaded end of the outer race engaging the nut such that the nut urges the beveled surface of the flange against the inclined surface of the housing bore; and wherein the housing and outer race are formed from metal, with the metal of the housing having a higher coefficient of thermal expansion than the metal of the outer race, whereby when the housing and outer race expand with a rise in temperature, the beveled surface of the outer race remains tightly against the inclined surface of the housing bore and the outer race does not shift radially within the housing.

10. The combination according to claim 9 wherein the inclined surface of the housing bore and the beveled surface on the flange of the outer race are inclined at the same angle with respect to the axis and are in face-to-face contact.

11. The combination according to claim 10 wherein the inclined surface of the housing bore and the beveled face of the flange on the outer race are conical.

12. The combination according to claim 11 wherein the outer race has first and second raceways which taper downwardly toward each other; wherein the inner race comprises first and second cones located end-to-end within the outer race, with each having a tapered raceway, the tapered raceway on the first cone being presented toward the tapered first raceway of the outer race and inclined in the same direction as that raceway and the tapered raceway of the second cone being presented toward the second raceway of the outer race and inclined in the same direction as that raceway; and wherein the rolling elements are tapered rollers organized in first and second rows with the first row being around the first cone and within the first raceway of the outer race and the second row being around the second cone and within the second raceway of the outer race.

13. An antifriction bearing for facilitating rotation about an axis, said bearing comprising first and second cones located end to end and having tapered raceways presented outwardly away from the axis and tapering downwardly toward each other; a unitary cup having first and second raceways presented toward the axis and surrounding the raceways of the first and second cones, respectively, the cup further having a cylindrical exterior surface that is presented away from the axis and a flange that projects outwardly beyond the cylindrical surface beyond one end of the cylindrical surface, the flange having a beveled surface at the end of the cylindrical surface, with the beveled surface being oblique to the axis.

14. An antifriction bearing according to claim 13 wherein the cup further has a threaded end projecting from it beyond the other end of the cylindrical surface.

15. An antifriction bearing according to claim 14 wherein the cup has an end bore opening out of it beyond the large end of its second raceway; wherein the cones have thrust ribs projecting away from the axis at the large diameter ends of their raceways, and the thrust rib of the second cone is located within the end bore of the cup; and wherein a seal fits into the end bore of the cup and around the thrust rib of the second cone to establish a dynamic fluid barrier at the end of the bearing.

* * * * *